Figure 1:
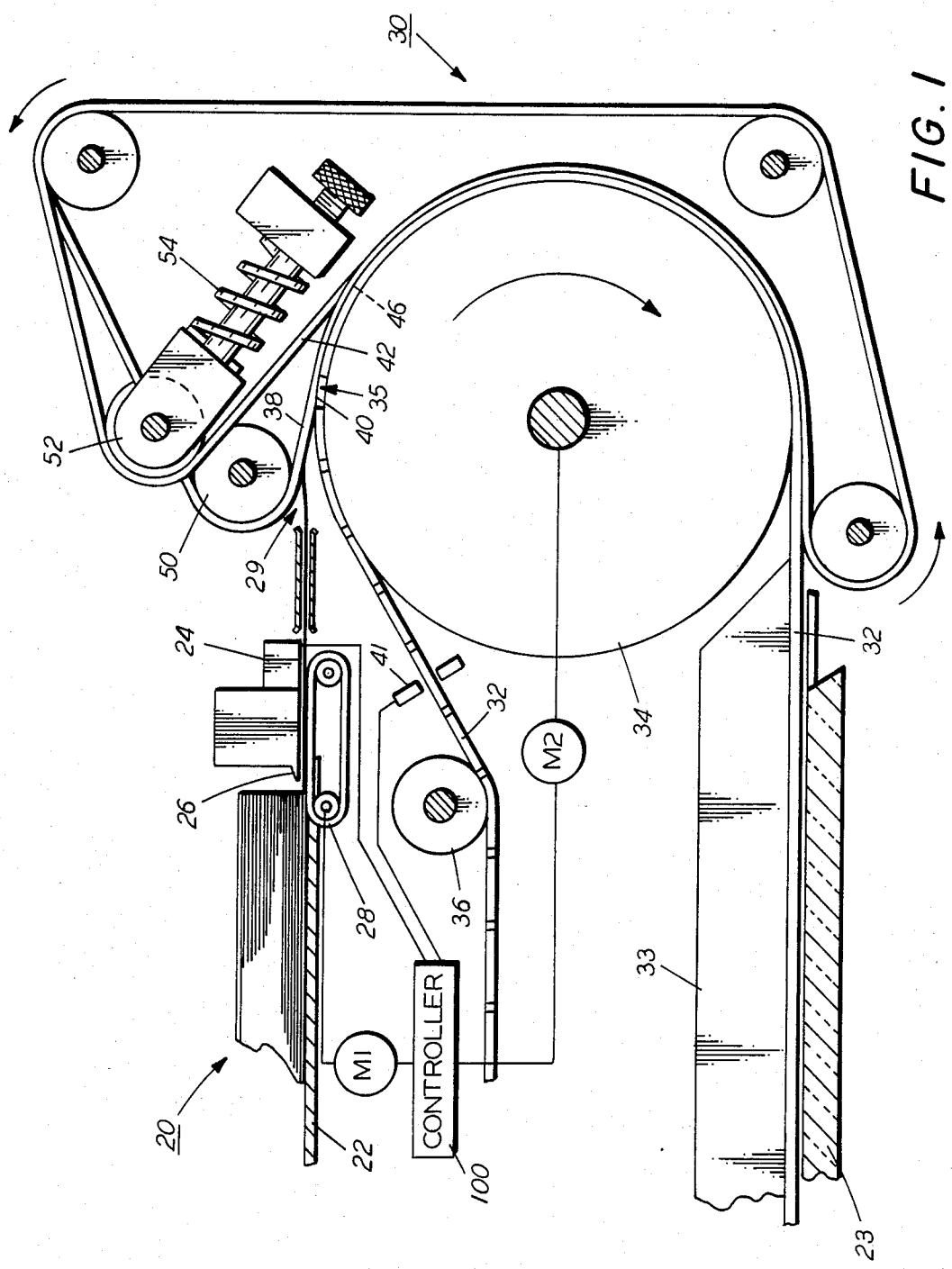

United States Patent [19]

Allocco, Jr. et al.

[11] Patent Number: 4,506,978
[45] Date of Patent: Mar. 26, 1985

[54] DOCUMENT REGISTRATION SYSTEM

[75] Inventors: Carmen Allocco, Jr., Pittsford; William R. Burger, Fairport; Steve S. Counoupas, Rochester, all of N.Y.

[73] Assignee: Xerox Corporation, Stamford, Conn.

[21] Appl. No.: 510,009

[22] Filed: Jul. 1, 1983

[51] Int. Cl.³ .............................................. G03G 15/00
[52] U.S. Cl. .............................. 355/14 SH; 355/3 SH; 271/3.1; 271/7
[58] Field of Search ................... 355/14 SH, 3 SH, 24, 355/3 R, 14 R, 8, 76; 271/3.1, 6, 7, 10, 34, 234, 9; 250/219; 83/203

[56] References Cited

U.S. PATENT DOCUMENTS

| | | | |
|---|---|---|---|
| 3,469,834 | 9/1969 | Stange et al. | 271/10 |
| 3,473,035 | 10/1969 | Gardner et al. | 250/219 |
| 3,817,515 | 6/1974 | Kanda | 271/9 |
| 3,863,912 | 2/1975 | Korff | 271/245 |
| 3,948,130 | 4/1976 | Schroter | 83/203 |
| 4,025,187 | 5/1977 | Taylor et al. | 355/14 |
| 4,078,787 | 3/1978 | Burlew et al. | 271/3.1 |
| 4,110,025 | 8/1978 | Tabata | 355/3 SH |
| 4,166,614 | 9/1979 | Hamlin et al. | 271/3.1 |
| 4,181,424 | 1/1980 | Okada et al. | 355/8 |
| 4,210,319 | 7/1980 | Hynes | 271/3.1 |
| 4,231,562 | 11/1980 | Hori | 271/3.1 |
| 4,278,344 | 7/1981 | Sahay | 355/14 SH |
| 4,286,870 | 9/1981 | Silverberg | 355/76 |
| 4,376,530 | 3/1983 | Akai | 271/10 |

OTHER PUBLICATIONS

Xerox Disclosure Journal, "Sheet Skew Correction and Registration System", James E. McCrea, vol. 5, No. 5, Sep./Oct. 1980, pp. 497, 498.
Xerox Disclosure Journal, "Store and Refeed Concept for an Inverter", Nitin M. Sevak, vol. 6, No. 4, Jul.-/Aug. 1981, p. 173.
Xerox Disclosure Journal, "Belt-On-Drum Output for Recirculating Document Handler", Edward W. C. Hanzlik, vol. 7, No. 4, Jul./Aug. 1982, p. 277.

Primary Examiner—A. C. Prescott

[57] ABSTRACT

In a document handling apparatus for registered feeding of document sheets to the imaging station of a copier with a document imaging station transport, and a document sheet acquisition and initial registration system for feeding document sheets to the document imaging station transport, the improvement wherein said document sheet acquisition and initial registration system includes a sheet inversion path with a sheet inverting roller and spaced plural sheet retaining belts partially wrapped around the inverting roller to provide separate document sheet lead edge capturing nips therewith, and to provide a non-slip document feeding path when a document is held between the plural belts and the roller, and with apparatus for mounting a central one of the plural belts differently from the other belts for centrally engaging a document sheet in a registration nip with the central belt prior to engagement of a document sheet in the capture nips of the other belts. Preferably the document imaging station transport includes a document imaging transport belt extending around the inverting roller to form the operative outer surface thereof against which document sheets are held by the plural belts, and the registration nip of the central belt registers the lead edge of the document sheet to this document imaging transport belt by providing a moving capture nip into which document sheets are driven by the document sheet acquisition and initial registration system at a slightly faster, coordinated, speed than the document imaging transport belt, and buckled thereagainst.

7 Claims, 2 Drawing Figures

DOCUMENT REGISTRATION SYSTEM

The present invention relates to an improved registration and acquisition system for original document sheets for document handling apparatus.

The system disclosed herein is an improvement in the document registration system for precollation copying system of U.S. Pat. No. 4,286,870 issued Sept. 1, 1981 to Morton Silverberg, in which a document is registered to a predetermined area of a document belt, which then transports the document to a registered imaging position. However, the present system is not limited to that apparatus and is usable with various other recirculative document handlers and copiers.

As xerographic and other copiers increase in speed, and become more automatic, it is increasingly important to provide higher speed yet more reliable and more automatic handling of the original documents being copied. However, the providing of recirculative document copying for precollation copying greatly complicates and increases the document sheet handling. A particular problem is the tendency to induce document sheet skew and/or lead edge position misregistration in the process of initially acquiring and feeding the document sheet to its imaging station.

The following terminology is generally used in the description herein. The term "sheet" generally refers to conventional sized flimsy sheets of paper, plastic, or other conventional or typical individual image substrates (original or copy), and not to microfilm or electronic images which are generally much easier to manipulate. However, the terms document, document page, or document image, unless specified as relating to sheets, may also be read as encompassing laser printed or otherwise electronically generated, stored, and/or rearranged images. The term "page" here generally refers to one side or "face" of a sheet or a corresponding image thereof. A "simplex" document or copy sheet is one having its page and image on only one side or face of the sheet, whereas a "duplex" document or copy sheet has pages on both sides. The term "duplex copying" may be more specifically defined into several different known copying modes. In "duplex/duplex" copying, both sides (both pages) of a duplex document sheet are copied onto both sides of a copy sheet. In "simplex/duplex" copying, the two page images of two successive simplex document sheets are copied onto the opposite sides of a single (duplex) copy sheet. In "duplex/simplex" copying, both sides of a duplex document are copied onto one side of two successive (simplex) copy sheets. In non-duplex copying, i.e. "simplex/simplex" copying, one side of each simplex document is copied onto one side of each copy sheet. In other printing arts, as contrasted to copier art, two-sided copying may be referred to as "backing-up" rather than duplex copying. A commercially desirable precollation document handling and copying system should compatibly provide all of these copying modes, although "duplex/simplex" need not be provided.

"RDH" is an abbreviation for an automatic recirculating document handler, in which document sheets are automatically fed from a stack, copied and returned thereto, normally for a precollation copying system. The present system is particularly suited for a precollation (multiply recirculated) document copying system, but is also compatible with non-precollation copying with the same apparatus.

Precollation, or collation copying, as it is variably called, is a known desirable feature for a copier, which provides a number of important advantages. In precollation copying any desired number of precollated copy sets may be made by making a corresponding number of recirculations of the original document set in collated order past the copier imaging station and normally copying each document page only once or twice each time it circulates past the imaging station. The copies automatically exit the copier in precollated sets, and thus do not require subsequent sorting in a sorter or collator. Proofing and on-line finishing and/or removal of any completed copy sets may thus be provided while further copy sets are being made from the subsequent circulations of the same document set.

However, a disadvantage of precollation copying system is that the set of documents must be recirculated and copied in a predetermined seriatim page order by a number of set circulations equivalent to the desired number of copy sets. Thus, increased document handling is required for a precollation copying system as compared to a post-collation copying system. Also, for duplex copying the copy sheets must normally also be recirculated once in the copying path in coordination with the document set recirculation in order to print images on both sides thereof. Therefore, maximizing document handling automation and copying cycle efficiency is particularly important in precollation copying. If the document handler cannot efficiently and rapidly circulate and copy documents in coordination with copy sheets in the correct order, or must excessively skip documents or copying cycles, the total copying time for completing all of the copy sets will be increased. Also, for collation copying, minimizing the time delay from the initiation of copying until the first copy set is completed and outputted is another important factor. This may be referred to as "first copy set out time".

In contrast, in a post-collation copying system, several identical copies are made at one time from each document page. Collation must be done after copying by each identical copy being placed in a different sorter bin. The document set need only normally be circulated or manually or semiautomatically fed to the imaging station once. Thus, at the end of the document set circulation each utilized bin of the copy sheet sorter or collator contains one collated copy set. However, the number the copy sets which can be made in one document circulation is limited by the number of available sorter bins. Also, a sorter adds space and complexity and is not well suited for on-line finishing. Further, the "first copy set out time" for any completed sets is delayed for the copying and collating of all the other sets of that copying run. However, post-collation copying, or manual document placement, are desirable in certain copying situations to minimize document handling. Also post-collation can employ slower document handling in that the copying rate is not limited by any document exchange times during the times the plural copies are being made. Thus, it is desirable in some cases that a precollation copying system be compatible with, and alternatively usable for, post-collation or manual document handling as well.

Both forward serial order (1 to N) and reverse order (N to 1) precollation copying of original documents, for both simplex (one-sided) and duplex (two-sided) original documents and copies, is shown in the cited art. Examples of 1 to N, normal, or forward serial order, document recirculation systems for precollation simplex or duplex copying systems are disclosed in U.S. Pat. Nos. 4,229,101 to T. J. Hamlin et al., 4,234,180 to J. H. Looney, and 4,355,880 to D. J. Stemmle, and art cited therein.

However, as further explained below, N to 1 (reverse order) document set circulation is commercially more conventional for systems feeding documents from a tray positioned over a platen of a copier. In such conventional systems the set of documents is loaded (stacked) face-up, and each document sheet is fed out from the bottom of the stack, copied, and restacked back on the top of the stack. Thus the simplex documents are circulated in an endless loop by being turned over, copied, turned over again, and returned back to the top of the stack over the platen.

A major disadvantage of such N to 1 or backwards document feeding and copying order is that the copier controller does not know what document pages are being fed on the first circulation, since the last (Nth) page is fed first. However, N to 1 document recirculation has been commercially utilized in spite of these disadvantages because bottom feeding and top restacking is preferred for a "racetrack" document circulation path. The documents may be recirculated in a short over-platen loop to and from a document stack located over the copier platen, and the entire RDH may be in a pivotal platen cover unit. Documents can be fed from one edge of the stack to the same side or edge of the platen underneath the stack, and then back from the opposite edge of the platen to the opposite edge of the stack. The documents may be stream fed unidirectionally over the platen. One document may be fed on while the prior document is feeding off. The document path has a short 180° loop turn above each side of the platen. With a shorter and unidirectional document recirculation path, document transport speeds can be lower and/or the number of copy pitches skipped in copying small (2-6) sheet document sets can be reduced.

Some examples of further details of such N to 1 or racetrack type recirculating document handlers and their applications are disclosed in U.S. Pat. Nos. 4,278,344 issued July 14, 1981 to Ravi B. Sahay; 4,324,395 issued Apr. 13, 1982 to Morton Silverberg; 4,335,954 issued June 22, 1982 to Russell L. Phelps; 4,270,746 issued June 2, 1981 to T. J. Hamlin; and 4,076,408 issued Feb. 28, 1978 to M. G. Reid, et al..

The system disclosed herein is particularly suitable for the initial feeding and inversion of a document sheet in its path from the stack over the platen to the platen for copying in an RDH.

Further details of exemplary copier controllers are disclosed in patents cited herein and in the following pending U.S. patent applications and foreign equivalents thereof: Ser. Nos. 420,965; 420,993 and 421,006 all filed Sept. 21, 1982. Examples of various other patents teaching known document handlers and copiers and control systems therefor, including document and paper path switches and counters, are U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270 and 4,335,949. Conventional simple software instructions in a copier's conventional microprocessor logic circuitry and software of document handler and copier control functions and logic, as taught by the above and other patents and various commercial copiers, are well known and preferred. However, it will be appreciated that the document handling and other functions and controls described herein may be alternatively conventionally incorporated into a copier utilizing any other suitable or known simple software or hard wired logic systems, switch controllers, etc.. Such software for functions described herein may vary depending on the particular microprocessor or microcomputer system utilized, of course, but will be already available to or readily programmable by those skilled in the art without experimentation from the descriptions and references provided herein.

The control of the exemplary document sheet handling system disclosed herein and related copier systems may be initiated by signals from the controller direct or indirectly in response to simple programmed commands and from selected activation or non-activation of conventional copier switch inputs by the copier operator, such as switches selecting the number of copies to be made in that run, selecting simplex or duplex copying, selecting whether the documents are simplex or duplex, etc.. The resultant controller signals may conventionally actuate various conventional electrical solenoid or cam controlled sheet deflector fingers, motors or clutches in the copier in the selected steps or sequences as programmed. Conventional sheet path sensors, switches and bail bars, connected to the controller, may be utilized for counting and keeping track of the positions of documents and copy sheets, as is well known in the art, and taught in the above and other patents and products. Known precollation copying systems utilize such conventional microprocessor control circuitry and connecting switches for counting the number of document sheets as they are circulated, counting the number of completed document set circulations, and thereby controlling the operation of the document and copy sheet feeders and inverters, etc..

The following exemplary references are of interest as to specific features of the system disclosed herein in addition to the above-cited U.S. Pat. No. 4,286,870. Other examples of document sheet belt transport systems, etc., for document sheets are shown in U.S. Pat. Nos. 4,231,562 issued Nov. 4, 1980 to T. Hori; 4,166,614 issued Sept. 4, 1979 to T. J. Hamlin et al.; 3,863,912 issued Feb. 4, 1975 to B. D. Korff; and Xerox Disclosure Journal publications Vol. 5 No. 5 September/October 1980, p. 497, 498; Vol. 6 No. 4 July/August 1981, p. 173; and Vol. 7 No. 4 July/August 1982, p. 277. Document sheet registration on a document belt apertured for photodetectors is disclosed in U.S. Pat. No. 3,473,035 issued Oct. 14, 1969 to J. F. Gardner et al., e.g. Col. 8. As to copy sheet buckling registration and other registration systems, examples are noted in U.S. Pat. Nos. 4,025,187; 3,817,515; 3,948,130; 3,469,834 and 4,181,424. Plural differently positioned belt feeders in other (copy sheet) applications are known, e.g. U.S. Pat. No. 4,376,530 issued Mar. 15, 1983 to N. Akai et al..

All references cited herein, and their references, are incorporated by reference herein for appropriate teachings of additional or alternative details, features, and/or technical background.

A specific feature disclosed herein is to provide, in a document handling apparatus for registered feeding of document sheets to the imaging station of a copier with a document imaging station transport, and document sheet acquisition and initial registration means for feeding document sheets to said document imaging station transport, the improvement wherein said document sheet acquisition and initial registration means includes a sheet inversion path comprising sheet inverting roller means and spaced plural sheet retaining belt means partially wrapped around said inverting roller means to provide separate document sheet lead edge capturing nips therewith, and to provide a non-slip document feeding path when a document is held between said plural belt means and said roller means, and means for mounting a central one of said belt means differently from the others of said plural belt means for centrally engaging a document sheet in a registration nip with said central belt means prior to engagement of a document sheet in the capture nips of said other belt means.

Further features which may be provided by the apparatus disclosed herein, individually or in combinations, include those wherein said document imaging station transport includes a document imaging transport belt extending around said inverting roller means to form the operative outer surface thereof against which document sheets are held by said plural belt means, and said registration nip of said central belt means registers the lead edge of the document sheet to said document imaging transport belt by providing a moving capture nip into which document sheets are driven by said document sheet acquisition and initial registration means at a slightly faster speed than said document imaging transport belt and buckled thereagainst to insure registration of the document sheet to a selected position on said document imaging transport belt; wherein control means are provided for feeding a document sheet into said registration nip of said central belt means in coordination with movement of said document imaging transport belt; and wherein said control means includes means for sensing a predetermined position of said document imaging belt, and means for sensing the position of a document sheet being driven into said capture nip of said central belt means.

Figure 2:
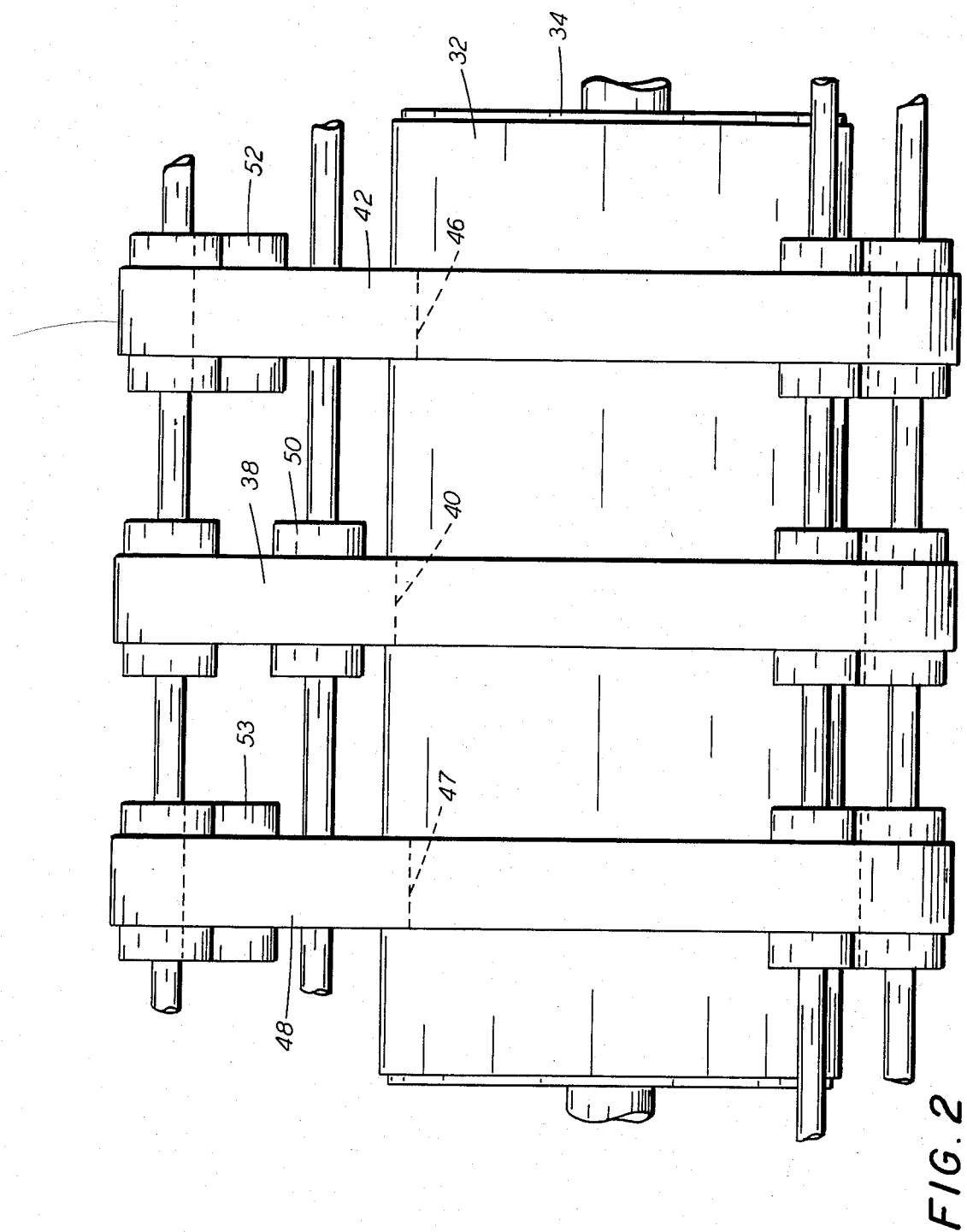

Various of the above-mentioned and further features and advantages will be apparent from the examples described hereinbelow of specific apparatus and steps of operation. The invention will be better understood by reference to the following description of one specific embodiment thereof, which includes the following drawing figures (approximately to scale) wherein:

FIG. 1 is a partial side view of an exemplary recirculating document handler for a copier with which the present invention may be practiced, and FIG. 2 is an end view of the embodiment of FIG. 1.

Referring first to the automatic document feeding unit 20 shown in FIG. 1, it will be appreciated that this is merely one example, and that various other alternative document feeding units and copiers may be utilized with the present invention, including various ones disclosed in the above-cited references.

In the exemplary N to 1 order recirculating document handler (RDH) 20 disclosed here, individual original document sheets are sequentially fed from a stack of document sheets placed by the operator face-up in normal forward collated order in the document stacking and holding tray 22, i.e. with page 1 on the top of the stack. Document sheets are fed from the bottom of the stack seriatim to the imaging station 23, which is the conventional copying platen of a copier to be conventionally imaged onto a photoreceptor for the production of copies in a generally conventional xerographic manner. The documents are stacked initially, and also restacked automatically during each circulation, in the tray 22 over the platen 23. The document handler 20 has conventional switches or other sensors such as 24 for sensing and counting the individual documents fed from the tray 22, i.e. counting the number of document sheets circulated. The sensor 24 here provides an additional function of indicating the passage and timing of the document lead edge from the document tray feeder as will be described. A conventional resettable bail or finger (not shown) drops to indicate through its associated set-counter the completion of each circulation of the complete document set, by sensing that all the documents have been fed out from under it, and then is automatically reset on the top of the stack before the next circulation. The document feeder 20 is adapted to continually serially recirculate the documents until a selected number of copy sets is made therefrom. The document sheets may be various conventional sizes and weights of sheets of paper or plastic containing information indicia to be copied on one or both sides, e.g. printed or typed letters, drawings, prints, photographs, etc.. A sheet corrugating vacuum feeder 28 selectably driven by a motor M1 and assisted by an air knife 26 feeds from the stack the bottom-most document sheet, on demand by the controller 100, past sensor 24 through an initial document feed path 29 to an initial registration/inverter unit 30. This unit 30 will be described in further detail hereinbelow.

It will be noted that only a portion of the copier and the upstream or right-hand side of the document handler illustrated herein, for drawing enlargement and therefore clarity. It will be appreciated that appropriate other portions of the RDH and appropriate associated copier may be as described in various of the above-cited references, and preferably include a selectable document return path providing inversion or non-inversion of the document sheet for duplex or simplex document sheet copying. A further, preferred, example of the later is disclosed in copending commonly assigned U.S. application Ser. No. 510,122, filed July 1, 1983, by William R. Burger, James E. Hutton and Morton Silverberg.

Each document sheet, as it is acquired by the air knife 26 and bottom feeder 28, is fed into registration with a selected position on a platen transport belt 32 in this disclosed system. The belt 32 preferably has spaced-apart limited areas of vacuum apertures and grooves as described in the above-cited U.S. Pat. No. 4,286,870. Also, preferably this is a single large area belt providing an optically uniform document imaging and backing surface as well as positive, non-slip, document feeding across the platen 23 into a preset registration position. The final registration of the document on the platen is preferably accomplished solely by control of a servo motor drive M2 to control the starting and stopping positions of the platen transport belt 32. Here one end of the transport belt 32 is mounted on, wrapped around, and driven by, a large diameter roller 34, at the upstream side of the platen 23 and driven by servo M2. The other end of the belt mounts to a smaller idler roller at the downstream side of the platen (not shown). This roller 34 also provides for inversion of the document sheets between the stack thereof in the tray 22 and the platen, by inverting the belt 32 with the document thereon. An adjacent idler roller 36 insures a large angle "wrap" of the belt 32 around the roller 34 circumference and also carries the upper flight of the belt 32 below the tray 22 and the bottom feeder 28. The lower flight of the platen transport belt 32 extends closely adjacent over (slightly above) the platen 23. It rides directly under a planar bottom surface of a vacuum manifold 33 containing appropriate apertures to apply vacuum through apertures in the belt 32 to retain document sheets positively thereagainst.

However, the initial transport and inversion of the document sheets from their initial feed path 29 to adjacent the platen is not be means of a vacuum here. Rather it is positively and mechanically by means of a positive wrapping and physical retention of the document sheet against the surface of the vacuum belt 32 as the belt 32 passes around the outside surface of the roller 34. The belt 32 in this system functions as a frictional, non-slip, transporting surface for the document sheet in the initial feeding and inversion of the document. The belt 32 outer surface is acting as the outer surface of roller 34 as far as the document sheet is concerned. Since the outer surface of the roller 34 is preferably a rigid, e.g. a metal, cylinder, the resilient belt 32 position is precisely controlled by the surface of the roller 34, as long as they are in contact. Of course, vacuum could be additionally applied also through the belt 32 from roller 34 if desired, but it is not needed here.

In the present system, registration occurs between the lead edge of the document sheet and the document transport belt 32 at a registration nip 40 formed by a central sheet holding belt 38 initially engaging the belt 32 while the belt 32 is on the upper surface of the roller 34. This registration nip 40 is directly in line with and closely adjacent the output path 29 of the document feeding unit. This system is designed so that the lead edge of each document sheet is forcibly driven and buckled into this registration nip 40. Preferably this registration of the lead edge of the document sheet to the desired area of the belt 32 occurs as an aperture 35 in the belt 32 at said registration nip 40. This registration position for the belt 32 may be determined or recalibrated by a belt aperture sensor 41 upstream of this registration position 40. Preferably the controller 100 is tracking the movement of the belt 32 at all times and controlling it through the servo motor M2.

The belt aperture 35 being registered to overlap the lead edge of the document provides for subsequent (downstream) precise or re-registration of the lead edge at its imaging position by a photosensor in the manifold 33 when that aperture passes the photosensor adjacent the desired lead edge imaging position (not shown) looking for and down through the belt aperture 35.

An important feature disclosed herein is the face that there is only one registration nip 40, with only one single central belt 38, not plural belt nips. Yet the transporting of the document around the radius of the roller 34 and onto the platen 23 is not just by this one central belt 38. It is also by two laterally spaced side belts 42 and 48. However, these side belts 42 and 48 have separate document sheet engaging nips 46 and 47 which are in line with one another but both spaced substantially downstream from the registration nip 40. This provides greatly improved document registration and control as opposed to the normal or conventional practice of providing plural registration nips in parallel transverse the document feeding direction. The latter is difficult to align and difficult to maintain with belt stretching or belt or roller misalignment, and tends to induce skew. Thus some prior systems have additionally required "hard" initial registration fingers at this point and mechanisms for inserting and retracting them from the sheet path at the critical times. With the present system, the sheet lead edge is first engaged, substantially at its midpoint, by the soft and moving belt 38, which is also positioned forward of the other belts by an idler roller 50 mounted lower than the idler rollers 52 and 53 for the other belts 42 and 48.

Note however that the second or capture nips 46 and 47 provided by the two side belts 42 and 48 need only be a few degrees of roller 34 rotation downstream from the registration nip 40, as shown, to provide this advantage. That is, once initial registration has occurred without inducing skewing at the central registration nip 40, it is then desired to firmly clamp, as soon as possible thereafter, the document sheet to the transport belt 32 around the roller 34 to insure that no skewing is induced in the further feeding of the document sheet. That is, after the downstream nips 46 and 47, the document sheet is pressed down by all three belts 38, 42 and 48, which are widely spaced apart and preferably of relatively high friction material so as to prevent any skewing. Furthermore, preferably all three said idler or holding belts 38, 42 and 48 are independently mounted, i.e. on separately rotatable idler rollers. This allows each of said holding belts to be independently driven at the exact speed of the copy sheet/belt 32 "sandwich" in the area which it is respectively holding down. This is particularly important if, for example there are irregularities in the document thickness or the particular document is so short in its transverse feeding direction that it does not underlie one of the side belts 42 and 48. It also allows for non-critical belt mountings and materials.

It may also be seen that with the present system the position of the belt tensioning system and the belt idler rollers 52 and 53 for the side belts 42 and 48 is non-critical. Thus, repositioning of the idler roller 52 by its illustrated spring tensioning mounting system 54 may slightly move the respective sheet capturing nip 46 thereof, but as long as this nip 46 remains downstream of the critical registration capture nip 40 it will have no effect on the registration of the document sheets, unlike a normal plural belt transport system.

It may also be seen that the lower upstream position of the active flight of the belt 38 compared to the other belts 42 and 48 insures that belt 38 is the only member normally engaging the upper surface of the document sheet as it approaches the registration nip 40, i.e. before registration. It also may be seen that the belt 38 is approaching its nip 40 with the belt 32 at a desirably small angle therebetween. This desirably provides a controlling leadin chute of two closely converging and commonly moving surfaces.

Summarizing the above-described registration operation, the document is moved towards the registration nip 40 at a relatively closely controlled velocity by the bottom feeder 28. The document sensor 24 detects the precise lead edge position of the document sheet in this movement and provides a signal indicative of the exact time at which the lead edge has passed sensor 24. The document belt 32 is also started in its movement in the same direction, but with relative movement relative the document sheet. The timing of the system is preferably controlled so that the lead edge of the document reaches the nip 40 at the same time as the registration or fiduciary mark on the document belt 32 (here the belt aperture 35) reaches the same point, i.e. the registration nip 40. However the velocity of the document sheet at that point in time is preferably slightly faster than that of the belt 32 so as to cause the lead edge of the document sheet to slightly buckle as it reaches this registration nip 40. Since the registration nip forming belt 38 is being driven by the belt 32 this automatically limits and matches the velocity of the document lead edge to the velocity of the belt 32. The degree or amount of buckling of the document lead edge is proportional to said speed differential. That is, if the lead edge of the document is approaching too fast it will simply cause slightly more buckle, or if it is approaching too slowly it will have slightly less buckle. In either case the registration position of the lead edge will not be changed and the document will be placed on the belt within the tolerance required for the registration position over the platen. Then after full document capture by the transport belt 32 the belt 32 velocity may be increased so that the document is pulled out and transported at high speed by the document belt 32 without any relative slippage therebetween, independent of the initial feeding speed of feeder 28.

It will also be noted that this is, desirably, not a "hard" nip. That is, in this system the lead edge of the document is not initially driven against stationary retractable plural metal fingers or the like, as has been practiced. Nor do any of the feed belts slip against the document while initial registration occurs. Rather the lead edge of the document is desirably driven with only a very slight force proportional to the slight amount of buckling thereof into a constantly moving nip consisting of two commonly moving resilient members, the belt 32 and the belt 38. Thus the potential for document wear or damage, particularly for multiple circulations, is greatly reduced. Yet the registration position is precisely controlled by the rigid surface of the roller 34 by which both belts are controlled at that point. The closely adjacent downstream pair of additional nips 46 and 47 with the two additional side belts 42 and 48 then further insures there can be no relative movement between the document sheet and the belt 32.

While the document handling system embodiment disclosed herein is preferred, it will be appreciated that this embodiment is but one example, and that various alternatives, modifications, variations, or improvements thereon may be made by those skilled in the art for this teaching which are intended being encompassed by the following claims:

What is claimed is:

1. In a document handling apparatus for registered feeding of document sheets to the imaging station of a copier with a document imaging station transport, and document sheet acquisition and initial registration means for feeding document sheets to said document imaging station transport, the improvement wherein said document sheet acquisition and initial registration means includes a sheet inversion path comprising sheet inverting roller means and spaced plural sheet retaining belt means partially wrapped around said inverting roller means to provide separate document sheet lead edge capturing nips therewith, and to provide a non-slip document feeding path when a document is held between said plural belt means and said roller means, and means for mounting a central one of said plural belt means differently from the others of said plural belt means for centrally engaging a document sheet in a registration nip with said central belt means prior to engagement of a document sheet in the capture nips of said other belt means.

2. The document handling apparatus of claim 1 wherein said document imaging station transport includes a document imaging transport belt extending around said inverting roller means to form the operative outer surface thereof against which document sheets are held by said plural belt means, and said registration nip of said central belt means registers the lead edge of the document sheet to said document imaging transport belt by providing a moving capture nip into which document sheets are driven by said document sheet acquisition and initial registration means at a slightly faster speed than said document imaging transport belt and buckled thereagainst to insure registration of the document sheet to a selected position on said document imaging transport belt.

3. The document handling apparatus of claim 2 wherein control means are provided for feeding a document sheet into said registration nip of said central belt means in coordination with movement of said document imaging transport belt.

4. The document handling apparatus of claim 3 wherein said control means includes means for sensing a predetermined position of said document imaging transport belt, and means for sensing the position of a document sheet being driven into said registration nip of said central belt means.

5. The document handling apparatus of claim 4 wherein said predetermined transport belt position of said document imaging corresponds to an aperture in said belt to which the lead edge of a document is registered in said registration nip by said control means.

6. The document handling apparatus of claim 1 wherein control means are provided for feeding a document sheet into said registration nip of said central belt means in coordination with movement of said document imaging transport belt; and wherein said control means includes means for sensing a predetermined position of said document imaging transport belt, and means for sensing the position of a document sheet being driven into said registration nip of said central belt means.

7. The document handling apparatus of claim 6 wherein said predetermined transport belt position of said document imaging corresponds to an aperture in said belt to which the lead edge of a document is registered in said registration nip by said control means.

* * * * *